(12) United States Patent
Barnes

(10) Patent No.: US 6,818,823 B2
(45) Date of Patent: Nov. 16, 2004

(54) QUICK INSTALLING, ELECTRIC CHIME AND BACK BOX

(76) Inventor: R. Lloyd Barnes, 2087 Barker Rd., West Valley City, UT (US) 84119

( * ) Notice: Subject to any disclaimer, the term of this patent is extended or adjusted under 35 U.S.C. 154(b) by 0 days.

(21) Appl. No.: 10/202,204

(22) Filed: Jul. 24, 2002

(65) Prior Publication Data

US 2004/0016561 A1 Jan. 29, 2004

(51) Int. Cl.$^7$ ................................................. H01J 5/00
(52) U.S. Cl. ........................... 174/50; 174/58; 220/4.02; 248/906; 439/535
(58) Field of Search .............................. 174/50, 58, 63, 174/17 R; 220/3.6, 3.8, 4.02, 3.92; 248/906; 439/535; 307/112

(56) References Cited

U.S. PATENT DOCUMENTS

| | | | | |
|---|---|---|---|---|
| 6,218,613 B1 | * | 4/2001 | Justiniano et al. | 174/50 |
| 6,239,365 B1 | * | 5/2001 | McEvers | 174/50 |
| 6,395,979 B1 | * | 5/2002 | English | 174/50 |
| 6,414,241 B1 | * | 7/2002 | O'Donnell | 174/57 |

* cited by examiner

*Primary Examiner*—Dhiru R Patel

(57) ABSTRACT

An electrical back box of galvanized metal or plastic with a barrier mounted in its interior. This barrier is the support for a low voltage transformer and the means of separating the low and high voltage wiring chambers. Knockouts provide access into these tow chambers for the required electrical wires. Retainer slots located in the interior of the box at the mounting end and at the opposite end provide and insertion point for wire springs. These wire springs are attached to a chime or any type of equipment that may utilize this backbox. When thrust into the retention slots, these springs provide a pulling force that snug the equipment up to the opening of the box. When this back box and transformer are used only for a source of low voltage power then there are two different types of covers that will cover the opening either flush or surface mounted and these make it electrically safe. These covers are mounted by the same wire springs method and are of plastic. When a metal cover is required then it will be supplied with a means of bonding to the equipment ground in the box thus providing electrical fault protection. When different size transformers are needed they can be mounted to the removable barrier but will require the mounting hole in the barrier to be individually sized.

1 Claim, 18 Drawing Sheets

Isometric View

Isometric View

Box Mounting End

Box Top View

Box Back View

Box Right View

Box Left View

Box Bottom View

Transformer Barrier Isometric View

Transformer Barrier Top View

Transformer Barrier Front View

Transformer Barrier Left View

Spring

Surface Cover Blank

Blank Cover Flush

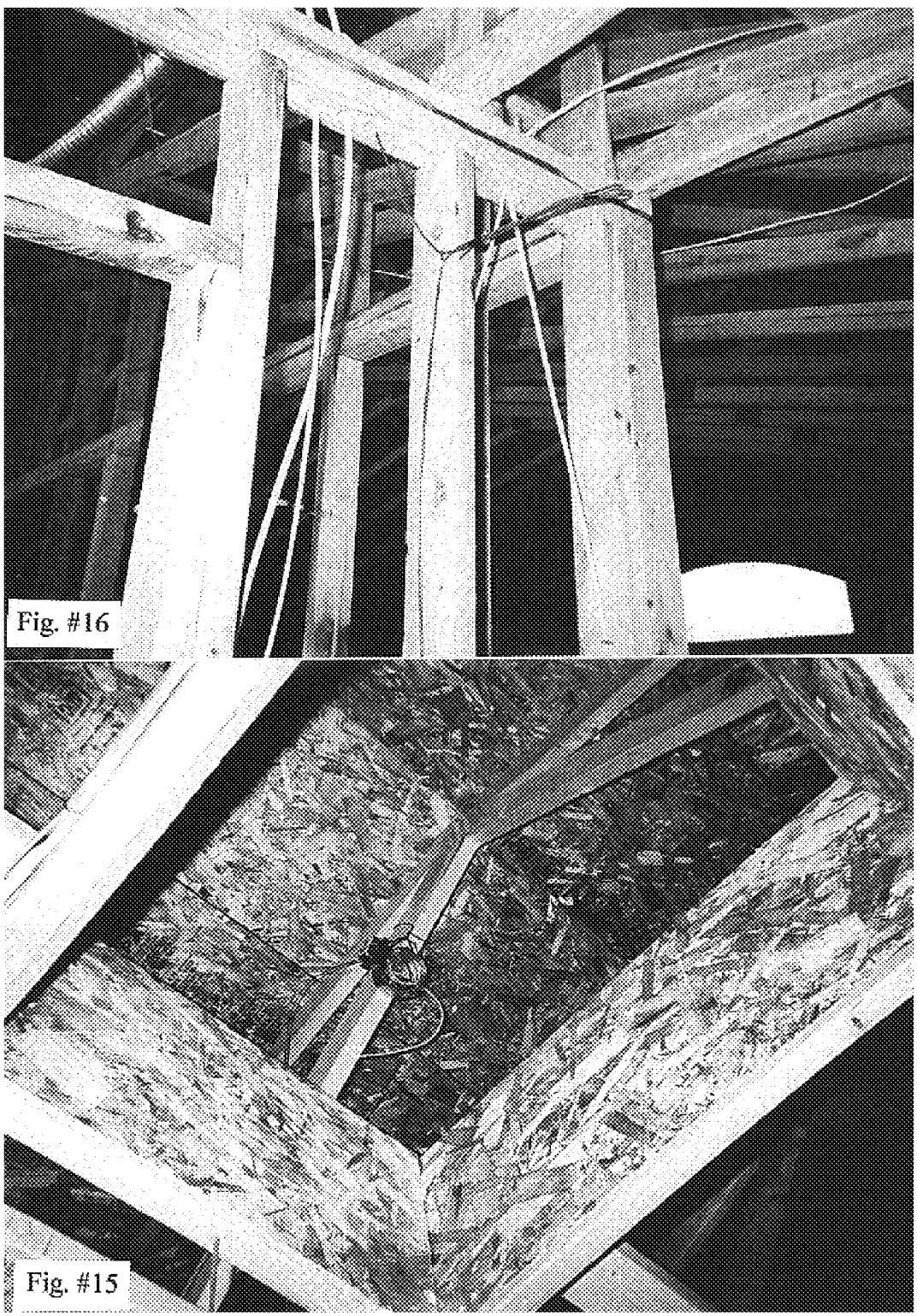

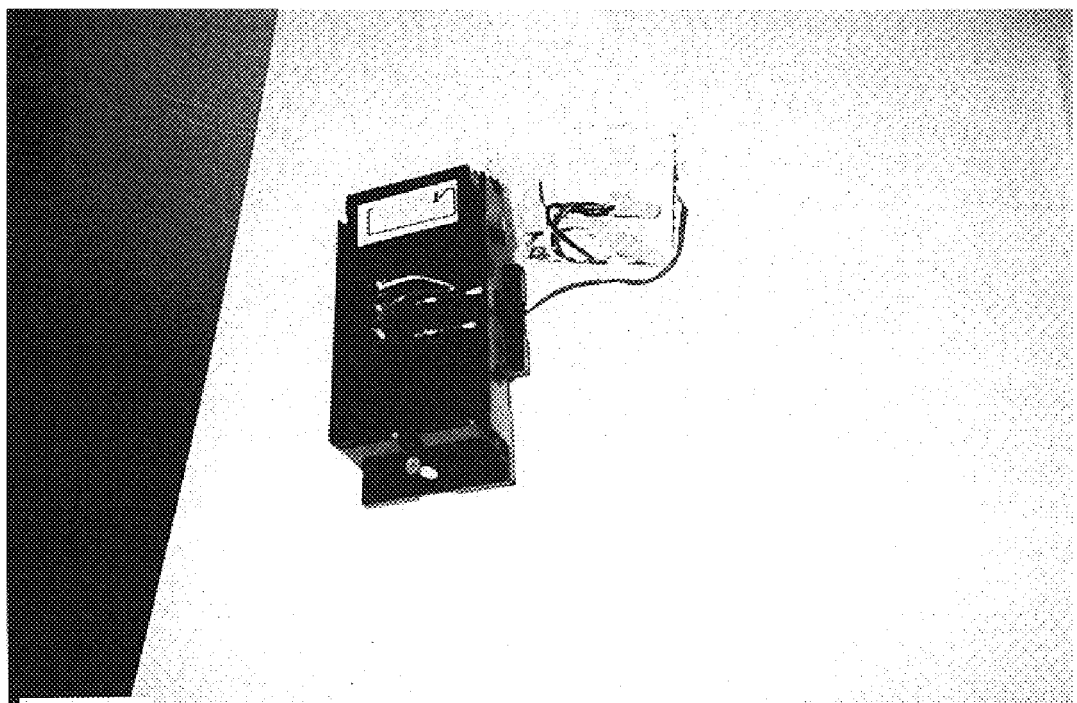
Fig. #18
Fig. #17

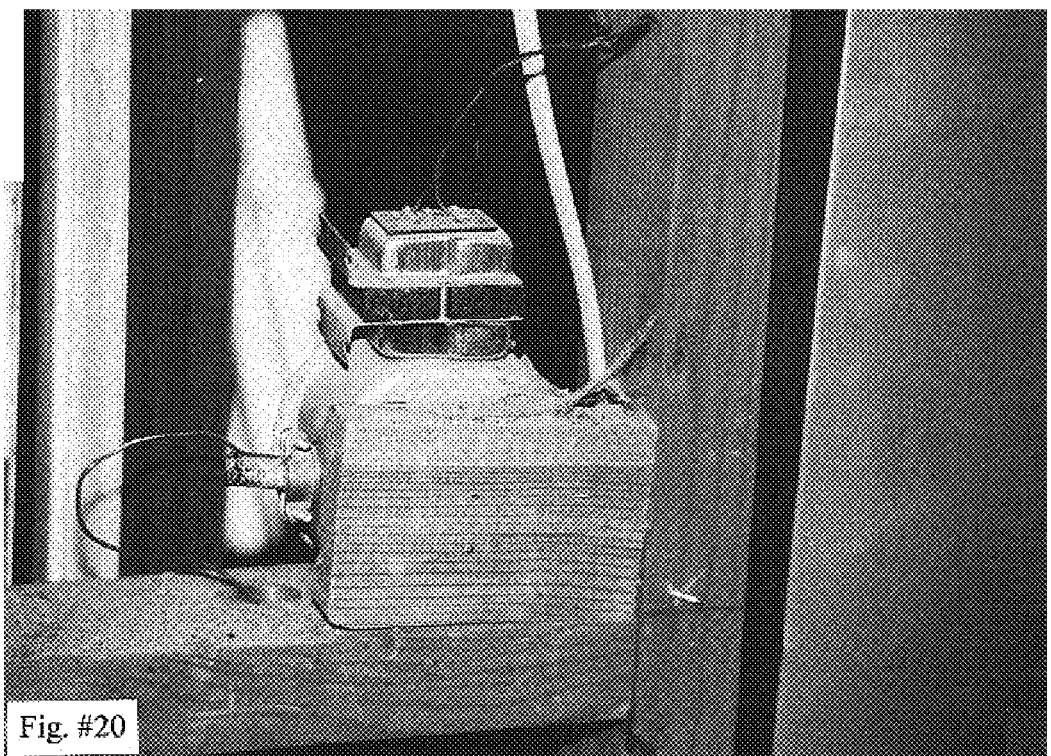
Fig. #20
Fig. #19

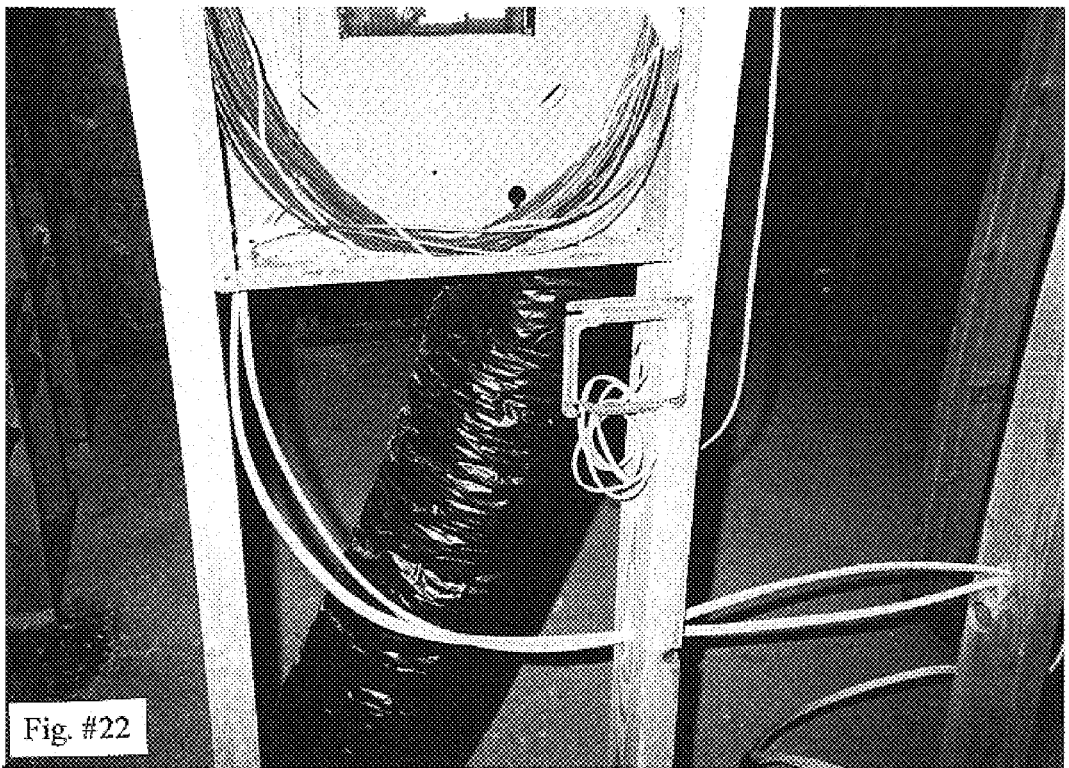
Fig. #22
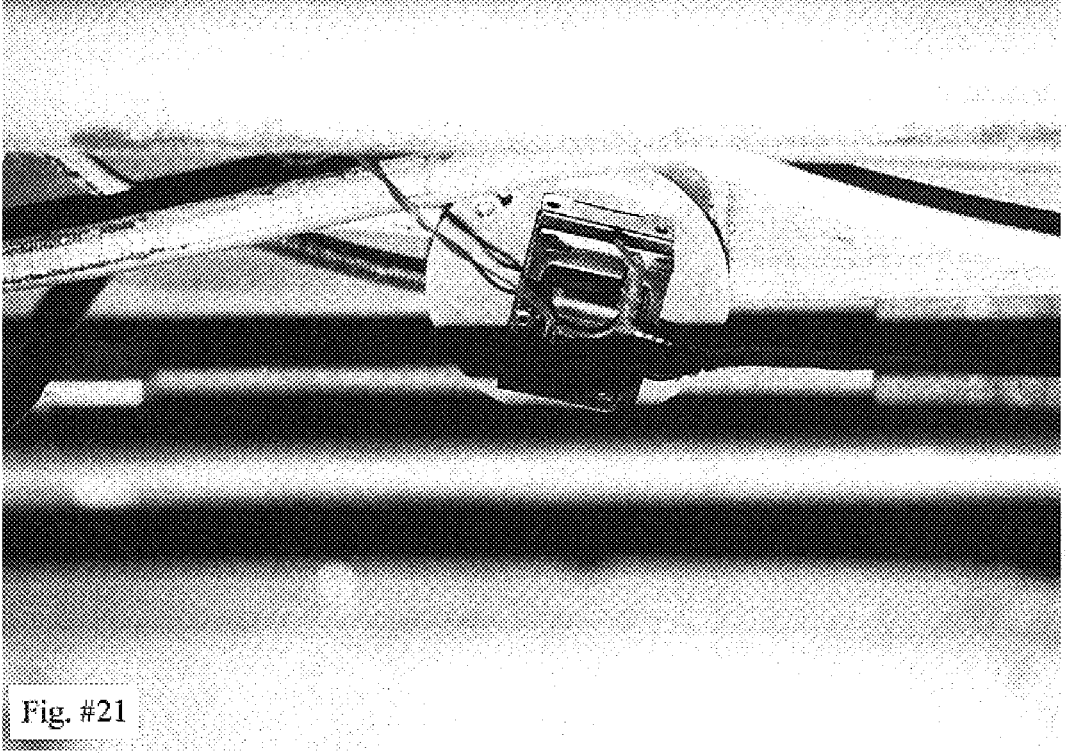
Fig. #21

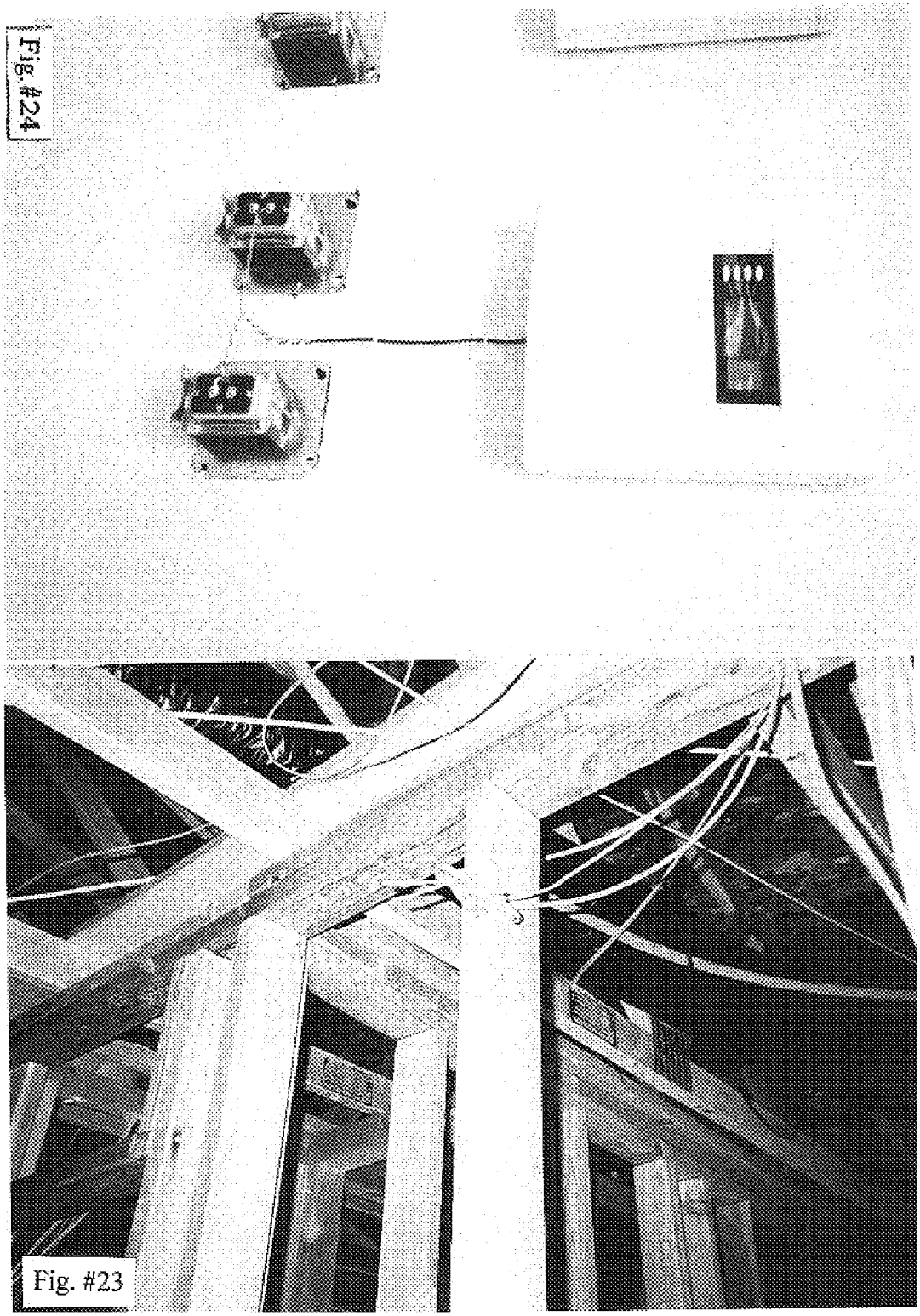

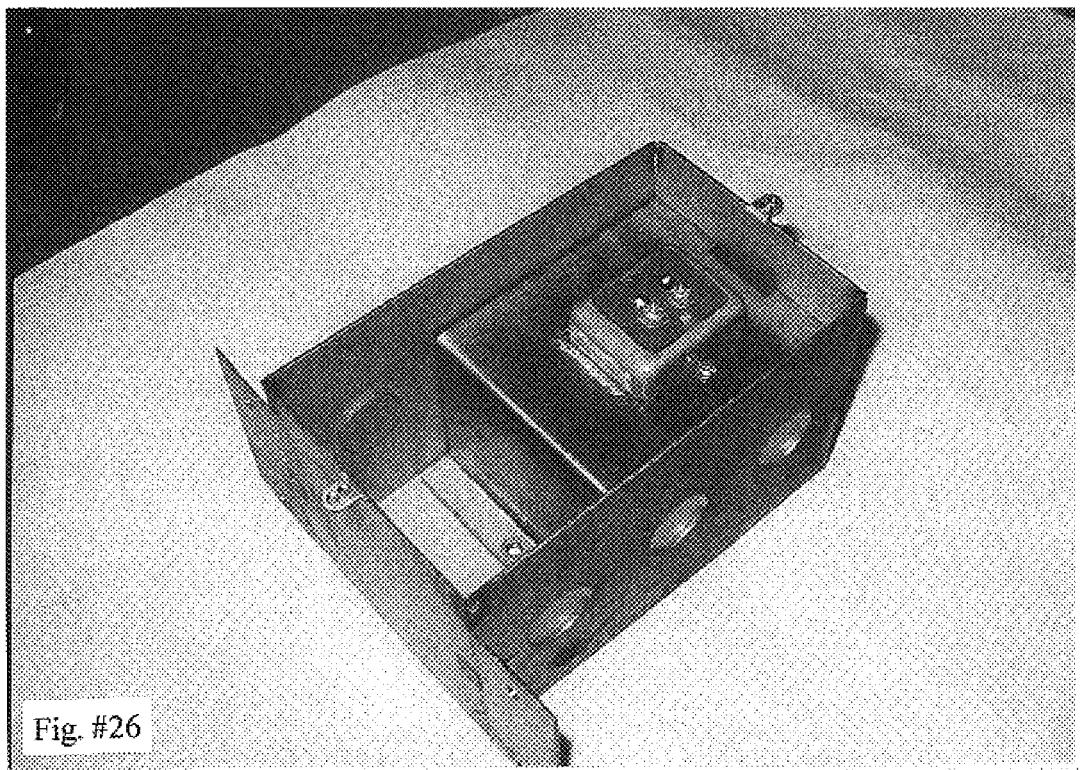
Fig. #26
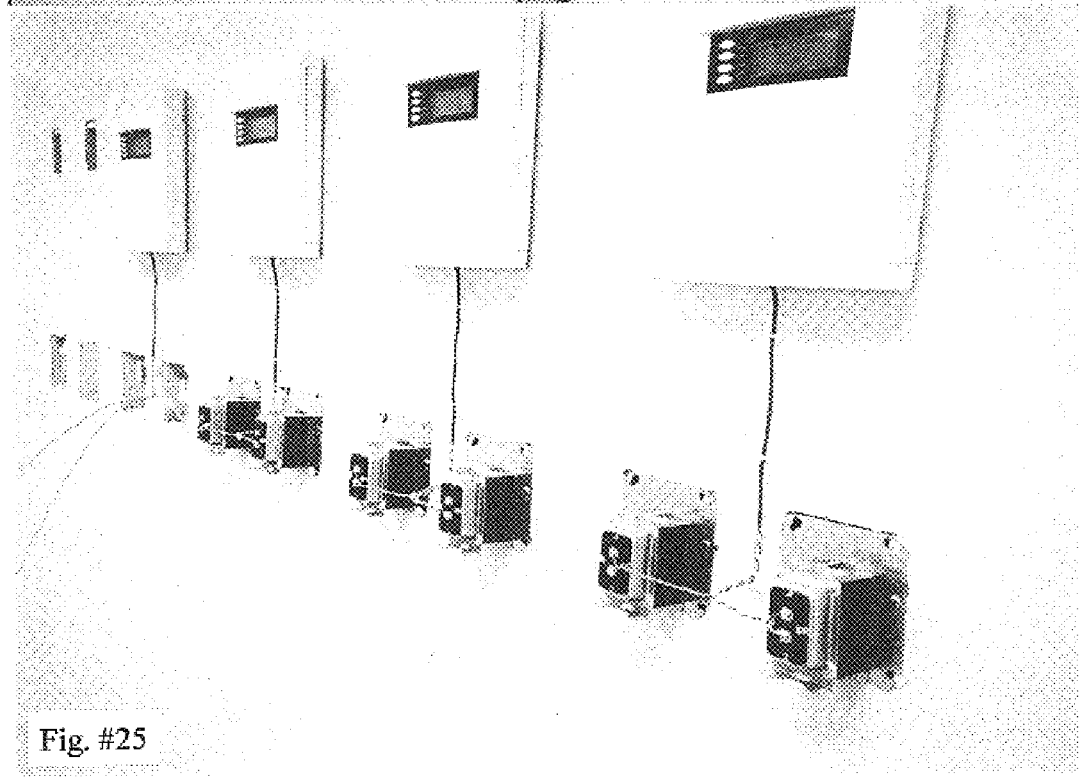
Fig. #25

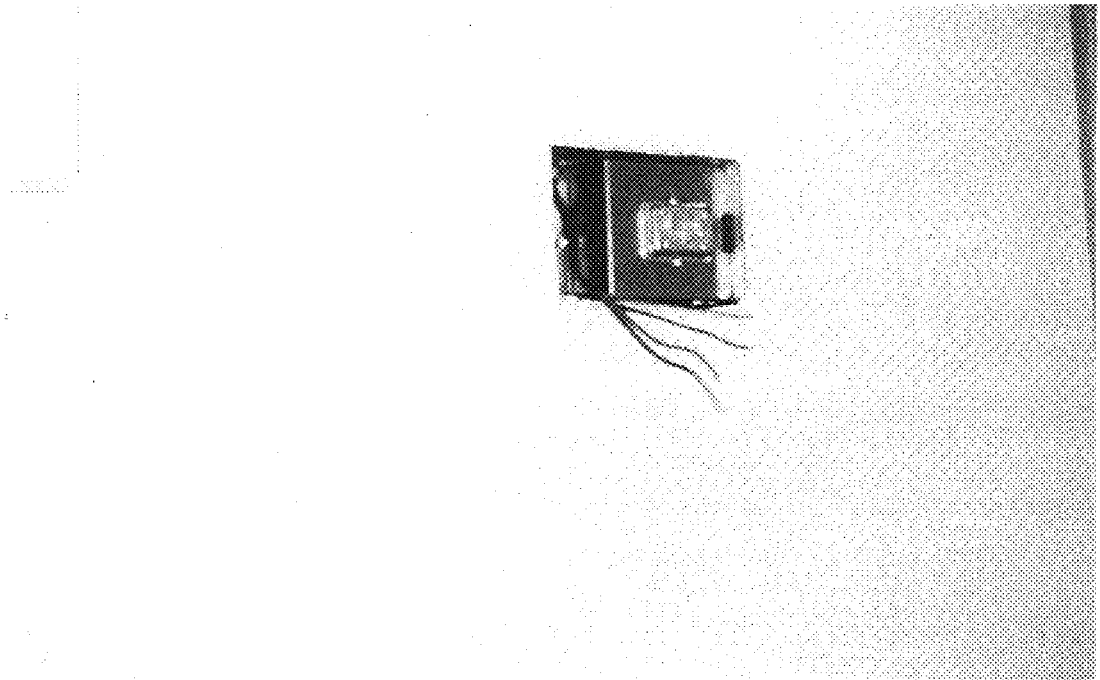
Fig. #28
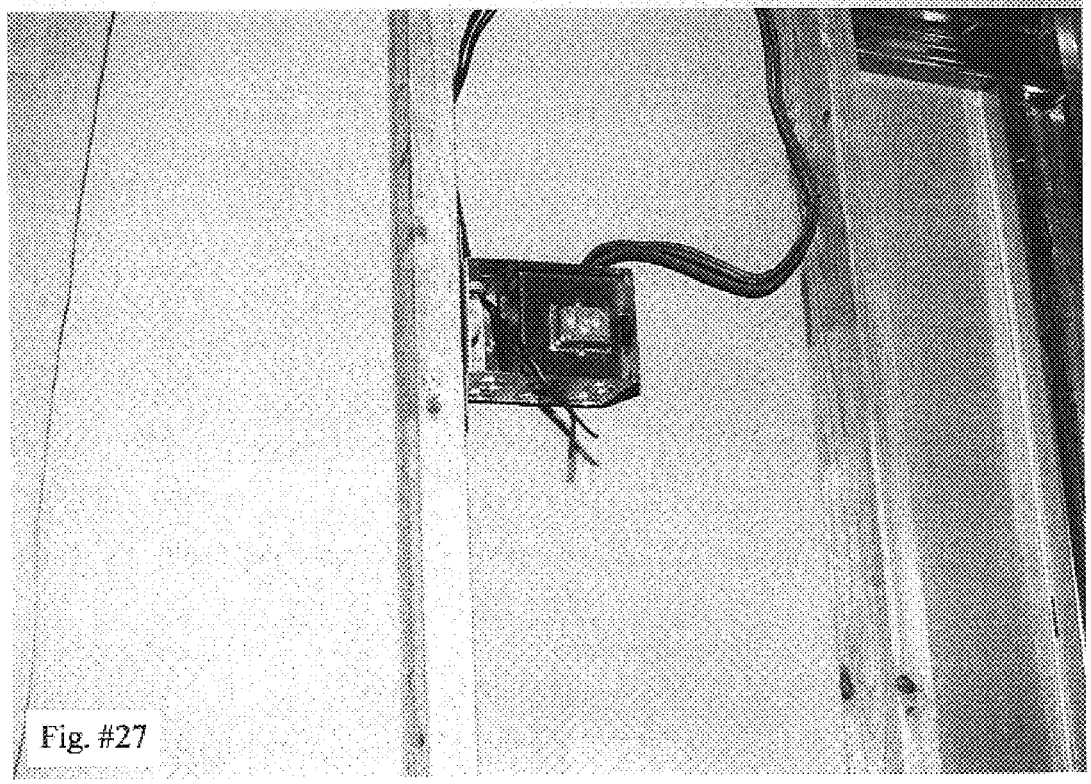
Fig. #27

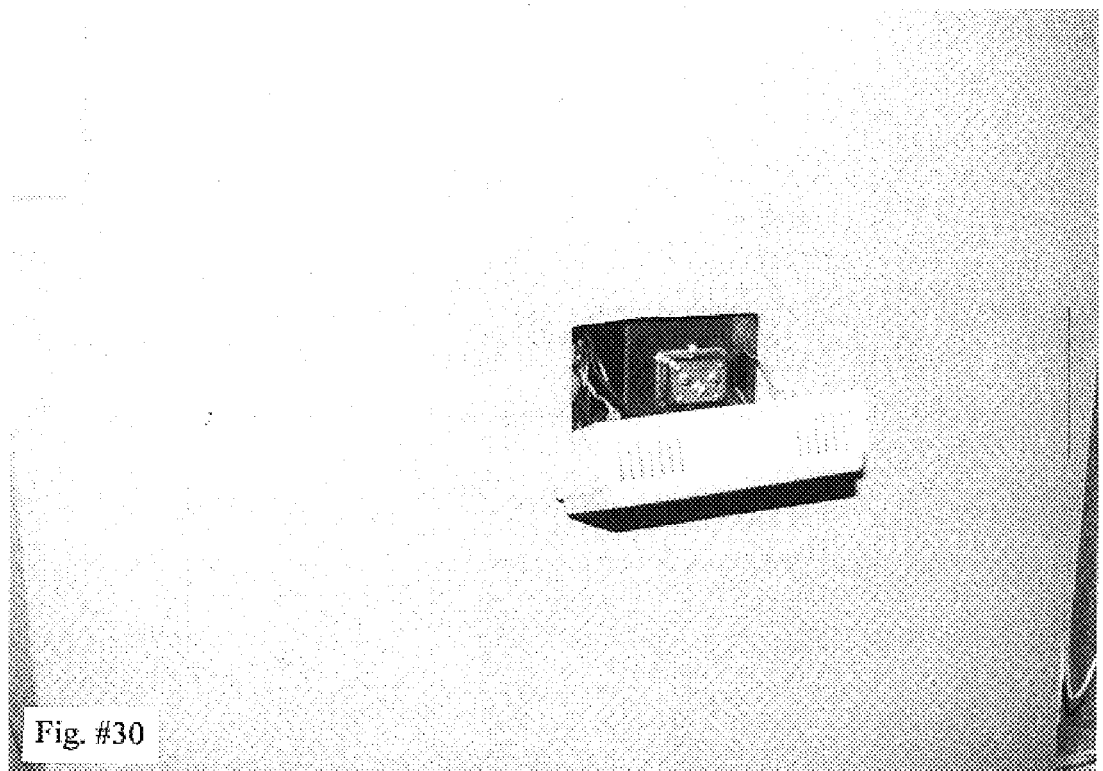
Fig. #30
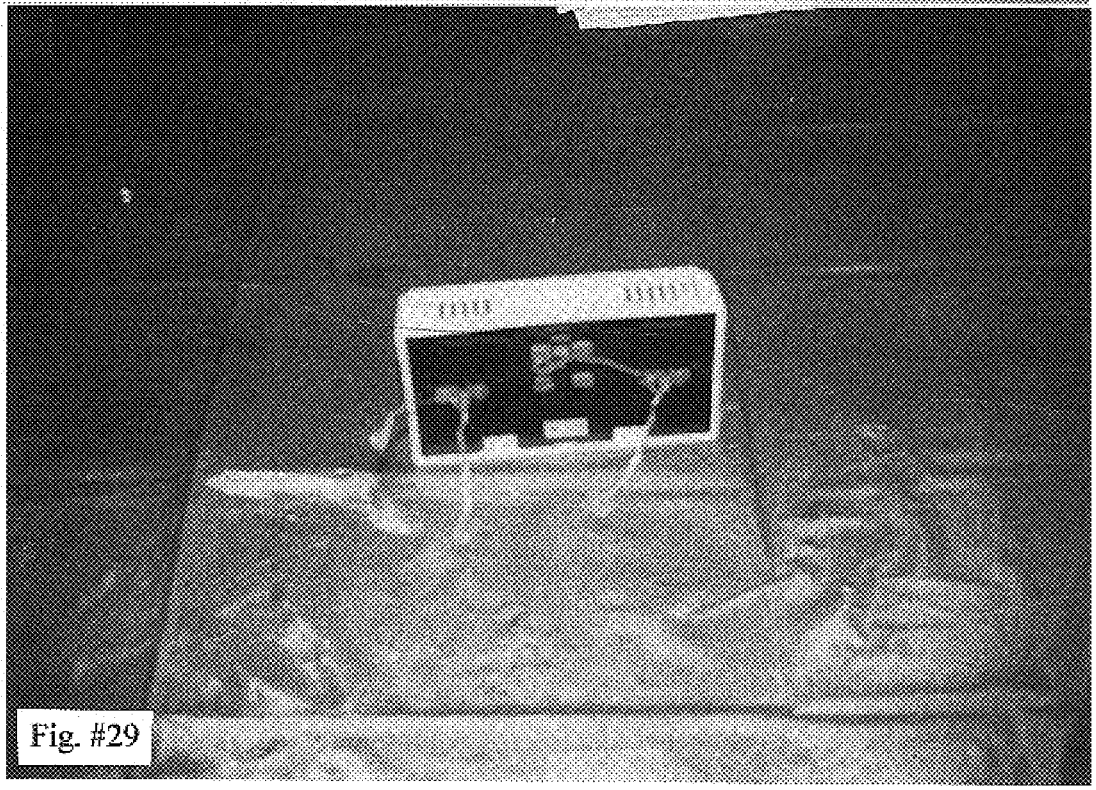
Fig. #29

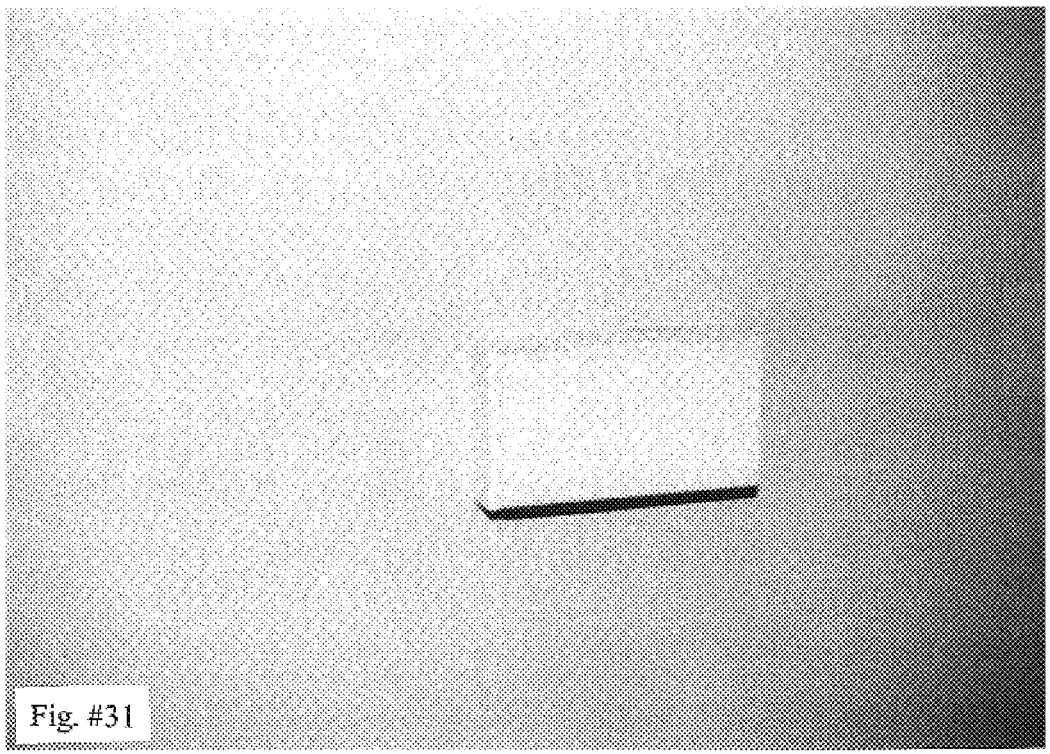
Fig. #31

QUICK INSTALLING, ELECTRIC CHIME AND BACK BOX

FEDERALLY SPONSORED RESEARCH

Not applicable

SEQUENCE LISTING OR PROGRAM

Not applicable

BACKGROUND FIELD OF INVENTION

This invention brings together an electric door chime, its transformer and an enclosure that combines them all into one assembly.

BACKGROUND DESCRIPTION OF PRIOR ART

Chimes (doorbells) have been installed in living units for most of the last century. While these have been effective enough in signaling occupants of these dwellings, the process of installation has changed through the years. The National Fire Protection Association and its electrical code body, NEC, have regulated installations of chime (doorbell) systems with equipment bearing the Underwriters Laboratory seal of approval. These systems were very fragmented due to the location requirements of the NEC. Bell transformers needed to be mounted to an electrical box so that they were on the outside and their 120 volt wires (Primary side) were in the inside where they could be spliced to the 120 volt source of power. The big problem for this was the location of these splice boxes. All splice boxes are required to be accessible, and the bell transformer was required to be accessible also. With finished walls and ceilings in dwelling units, there remained only two areas of accessibility. These areas were the attics and the basements or crawl spaces under the floor.

FIG. 15 shows a typical attic installation on a 4" octagon metal splice box. The larger white wire is what electricians refer to as Romex. This is the source of 120 volt power. The two smaller brown wires are 24 volt rated wire and take the lower voltage produced on the secondary side of the transformer to the chime (doorbell). Additional 24 volt wire must be run from the bell to the doorbell buttons at the front and back doors of the living units.

FIG. 16 shows a typical wall location for the chime. One of the gray wires is going to the transformer while the other is going to the doorbell button. When the wall board is installed the only thing that will be seen is the loop of gray wire sticking out of the wall. The chime is hooked to these wires and then screwed to the wall. If backing is not placed in the wall then the chime is only screwed to the Sheetrock, which is not very substantial.

FIG. 17 shows details of a common chime location in front of a black 2 gang plastic box. The three bell wires going into this box are the lead from the transformer, the lead from the back door button and the lead from the front door button. It was the electrician's intent to set the transformer in this box, but the installation was rejected because it did not meet code. Afterwards he relocated the transformer remotely, and ran the low voltage wire back to the box.

FIG. 18 shows a 2 gang plastic box which originally had the transformer mounted inside of it along with the 120 v and 24 v wire. The chime was unscrewed from the wall where it was covering the box, because the inspector was suspicious about its compliance with code. When the chime was swung to the side it revealed that the transformer was indeed placed in the box behind the chime.

FIG. 19 shows the new location of the transformer mounted on the other side of the wall.

FIGS. 20 and 21 show accessible locations for bell transformers in basement furnace rooms.

FIG. 22 shows an attempt to install a transformer in an accessible place. The transformer will be attached to the bottom of the electrical panel behind the plaster ring. The 120 v wire will be inside of the panel and the 24 v wire and the transformer will be in side the wall below the panel. This is a legal installation. It is an awkward place to install the transformer and requires a blank 2 gang plate to cover it. The blank plate does not make a pretty installation. The hand hole provided by the 2 gang plaster ring does not allow much room for grasping the transformer if a change out is required.

FIG. 23 shows the chime location in the hallway of this apartment. The wires will be connected to the back of the chime and then the chime will be screwed to the Sheetrock. As you can see there is no backing provided for the chime screws.

FIG. 24 shows process controls fed by low voltage wires (24 v). These wires are taped off from surface mounted transformers. Because access is required for the transformers and given the restrictions of mixing class 1 and class 2 wire together, there is presently no other way to make this installation. There is no prior art the could be used to eliminate this problem. What is available is not designed for the purpose and would be much more expensive. Large surface mounted enclosures are available but would only add to the bad looks of this installation.

OBJECTS AND ADVANTAGES

Accordingly, besides the objects and advantages of the chimes and transformers found in industry today, several objects and advantages of my present invention are:

1. to provide a means of placing a doorbell transformer in a common and accessible location. This will become an industry standard.
2. the mounting of the transformer in a metal box to provide proper support for and adequate heat dissipation as will be required by UL.
3. this assembly will meet the requirements of the NEC.
4. the chime which will be part of this assembly, will mount to the metal box without screws. Wire springs will mate with 2 slots in the box and pull the chime up tight to the box.
5. the box will be a housing for the transformer and will have separate areas for the low voltage wire and the high voltage wire. It is also the mounting base for the chime.
6. the chime will completely cover the flush mounted back box when it is pushed tight against the wall. The normal person will not know that the back box is even there.

SUMMARY OF THE INVENTION

In accordance with the present invention, the Speedie-Chime comprises an assembly of a chime, a back box, and a transformer. The mounting of the chime and transformer to the back box, satisfies the requirements of the NEC and can be UL approved. The Speedie-Chime brings together these components which up till now could not be brought together in a manner that would meet NEC codes.

BRIEF DESCRIPTION OF THE DRAWINGS

Drawing Figures

In the drawings, different directional views are identified by a figure number.

FIG. 15 shows transformer mounted in attic.

FIG. 16 shows bell wire extending out of open wall.

FIG. 17 shows 2 gang box not suitable for transformer housing.

FIG. 18 shows 2 gang box that was in violation.

FIG. 19 shows new location of transformer removed from FIG. 18.

FIG. 20 shows typical existing transformer location.

FIG. 21 shows a bad existing transformer location.

FIG. 22 shows a pending transformer location.

FIG. 23 shows bell wires extending out of stud wall.

FIG. 24 shows surface mounted transformers for controls.

FIG. 25 shows large number of surface mounted control transformers.

FIG. 26 shows present invention ready to install in open wall.

FIG. 27 shows box (invention) installed and wired in open wall.

FIG. 28 shows box as it looks after wall board has been installed.

FIG. 29 shows back of chime and its mounting springs.

FIG. 30 shows chime mounted to box but not pushed in.

FIG. 31 shows chime after it is pushed in against wall.

Figure 1:
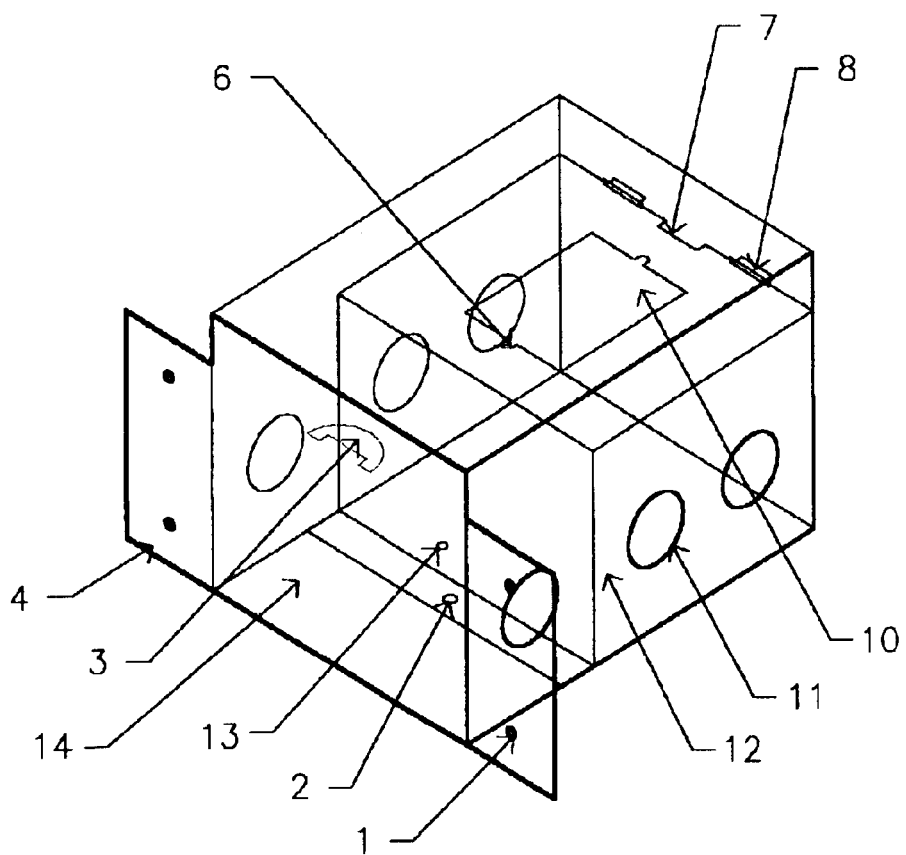
FIG. 1 shows box isometric view with interior barrier in place.

REFERENCE NUMERALS IN DRAWINGS 1. 1/8" box mounting holes.
2. 10/32" tapped barrier securing screw hole.
3. front wire spring adapter slot.
4. box mounting flanges.
5. score lines for easy break off of mounting flanges.
6. slots to adapt the (2) end extensions of the transformer mounting barrier to the end the box.
7. rear wire spring adapter slot which is part of the transformer mounting barrier.
8. barrier end extensions or tabs that mate with the adapter slots in end of box.
9. back end slots for insertion or mating of barrier tabs.
10. opening for transformer mounting which will differ in dimensions according to transformer ratings (size).
11. 7/8" knock-outs for electrical wiring entrances, (3) right and (3) left.
12. electrical wiring area for 120 v connections behind barrier.
13. 10/32" tapped hole for bonding box to electrical ground system.
14. 24 v wiring area outside of barrier
15. transformer shown mounted on barrier with the 24 v wire terminals exposed. These terminals can be screws or any other quick type connection available.
16. spring adapter hooks providing connection of wire springs to chimes, covers or other types of equipment. This should not limit the type of connections that will be used to attach the wire springs to devices but is used to show one method of several.

DETAILED DESCRIPTION

Description FIGS. 1, 2, 3, 4, 5, 6, 7 -Preferred Embodiment

Figure 2:
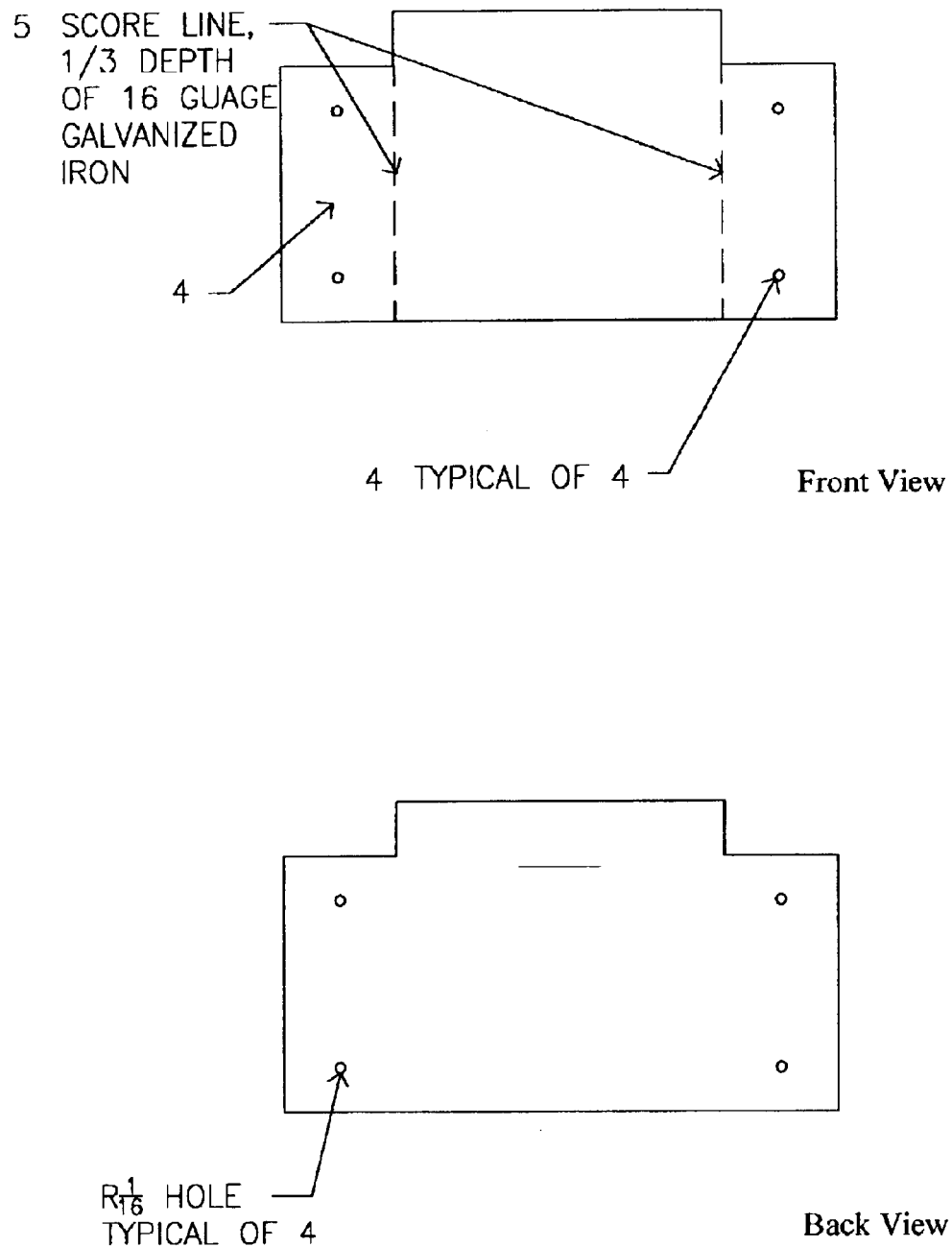
FIG. 2 shows box mounting end with mounting holes for screws or nails.
Figure 3:
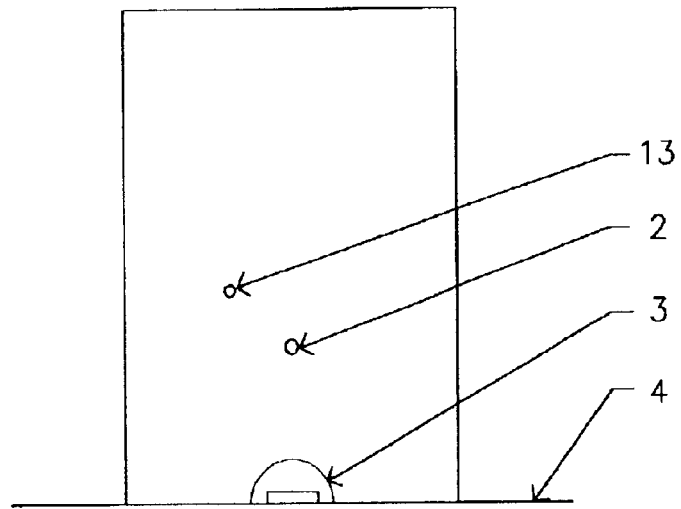
FIG. 3 shows box top view revealing the interior without the barrier in place.
Figure 4:
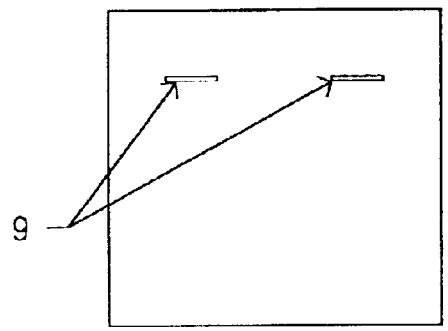
FIG. 4 shows box back view showing barrier adapting slots.
Figure 5:
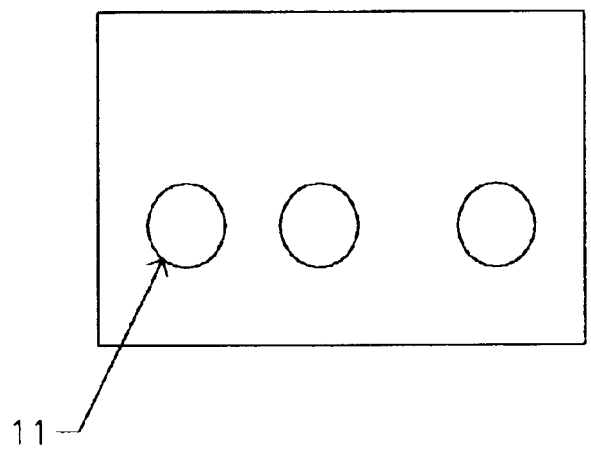
FIG. 5 shows box right side view showing knock-outs for electrical wiring entrance.
Figure 6:
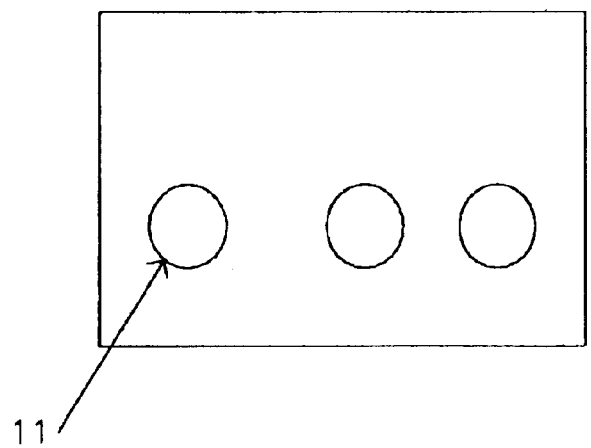
FIG. 6 shows box left side view showing knock-outs for electrical wiring entrance.
Figure 7:
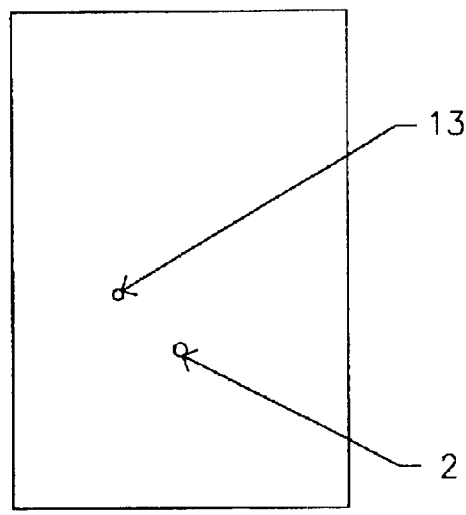
FIG. 7 is box bottom view showing location of tapped holes for securing interior barrier and for electrically grounding of box.

A preferred embodiment of the box of the present invention is illustrated in FIGS. 1 thru 7. The box is constructed of 16 gage galvanized sheet metal. The front of the box as shown in FIG. 2, is large enough to secure the box in a horizontal or a vertical direction by use of screws or nails through the holes in flange, FIG. 4. If box is to be mounted in masonry units, then the flange FIG. 4 would be broken off top and bottom at FIG. 5, thus creating a nice square box that could be easily mounted flush in the masonry location. In the mounted position, the box is ready to receive its electrical wiring through knockouts displayed in FIG. 5 and FIG. 6. These knockouts are sized for use with 1/2" conduit or NM type cable requiring 1/2" connectors. In masonry units the flange in FIG. 4 would be broken off at FIG. 5. The 24 v wire for all uses will enter either right or left through knockouts 11 of the low voltage compartment which area is closest to FIG. 2. The 120 v conduit will be connected to (2) knockouts right or left 11 that access the area FIG. 12 behind the barrier FIG. 8. The NM electrical cable will also pass through any of these (4) for connections to the knockouts leading into the same area, FIG. 12. FIG. 3, which is looking down into the opening of the box, exposes the adapter 3 which is either welded in place or punched from the side, FIG. 2, and bent into the box to form the wire spring adapter. The bottom of the box when looking into it from its opening, FIG. 3, shows (2) holes. Both of these holes 2 and 13, are taped for 10/32" screws. Hole 2 is for securing the barrier FIG. 8 to the inside bottom of the box FIG. 1. The securing of this barrier to the inside bottom of the box also makes the barrier electrically continuous to the box incase of a fault current developing. Hole 13 is for attaching a grounding pigtail which is to connect to the equipment ground conductor that is a part of the NM cable. FIG. 4 shows the back of the box FIG. 1 and the (2) slots 9 which are ready for the insertion of the barrier tabs 8 which when done mount one end of the barrier FIG. 8. When tabs 8 are inserted into the slots 9 and the barrier, FIG. 8, is swung down into the box FIG. 1, the 10/32 41 screw can be inserted through the 5/32" hole in the barrier and tightened to secure the barrier, FIG. 8, to the box interior.

Figure 8:
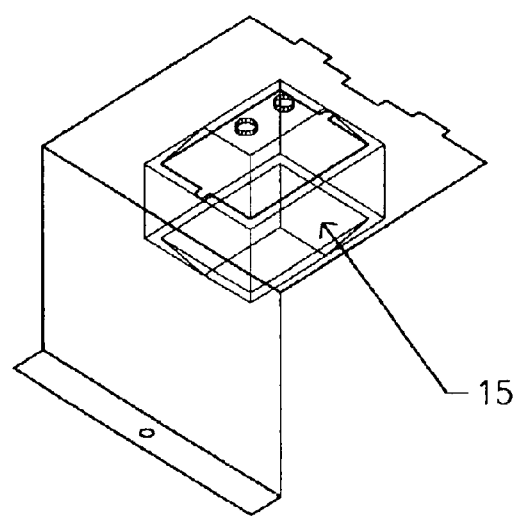
FIG. 8 shows by isometric view, the barrier which is also the transformer support.
Figure 9:
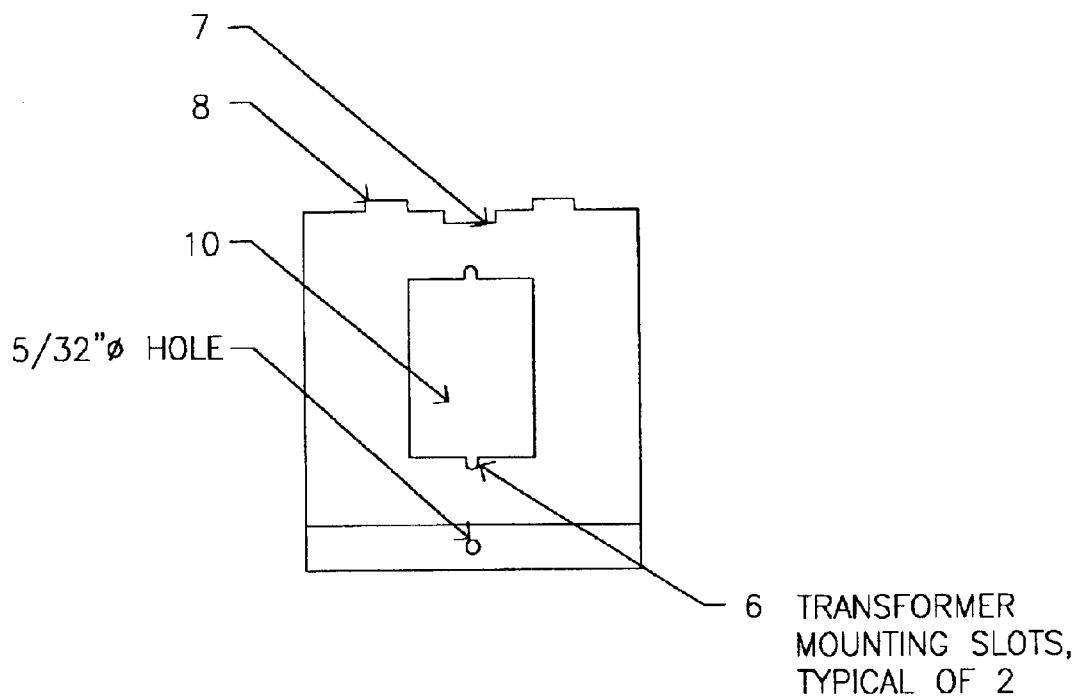
FIG. 9 shows barrier top view.
Figure 10:
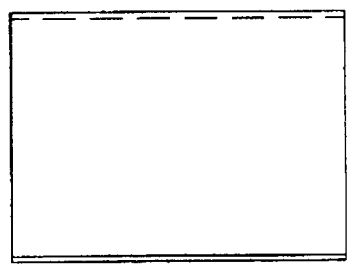
FIG. 10 shows barrier front view.
Figure 11:
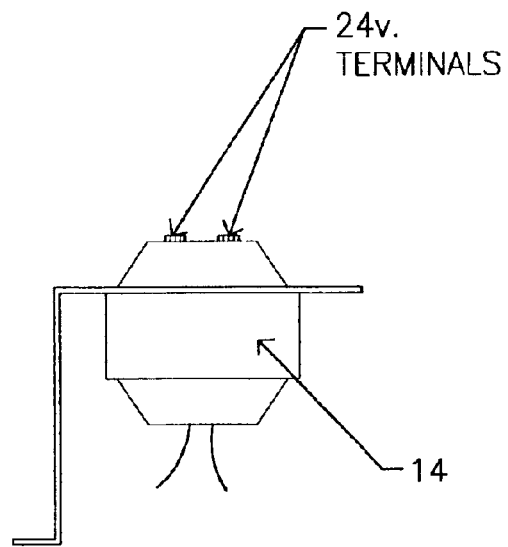
FIG. 11 shows barrier with transformer mounted as viewed from the right side.

FIGS. 8, 9, 11, Additional Embodiments

Additional embodiments are shown in FIGS. 8, 9, and 11; in each case only one size of transformer 15 is shown. By re-sizing the transformer mounting hole 10, various sizes of transformers can be installed making it usable for several types of equipment. Transformer slots 6, may vary in dimension with the different sizes of transformers 15. This would also require the box FIG. 1, and the barrier FIG. 8 to be increased in size to make the complete device combination properly sized to meet UL and NEC requirements. Transformer mounting slots 6 may vary with the different sizes of transformers. The present embodiment shows slots 6, but with other means of fastening transformer to barrier, FIG. 8, a hole for the use of rivets or other means may be used The transformer 15, as shown is mounted to the barrier, FIG. 8, with 6/32" screws and nuts to match.

Figure 12:
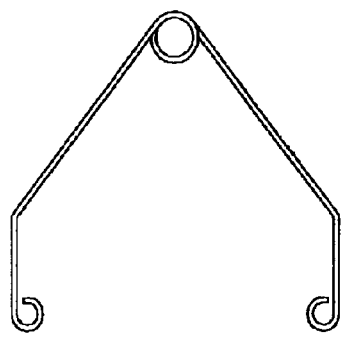
FIG. 12 shows one version of wire spring used for mounting chime, covers and other types of equipment to box.
Figure 13:
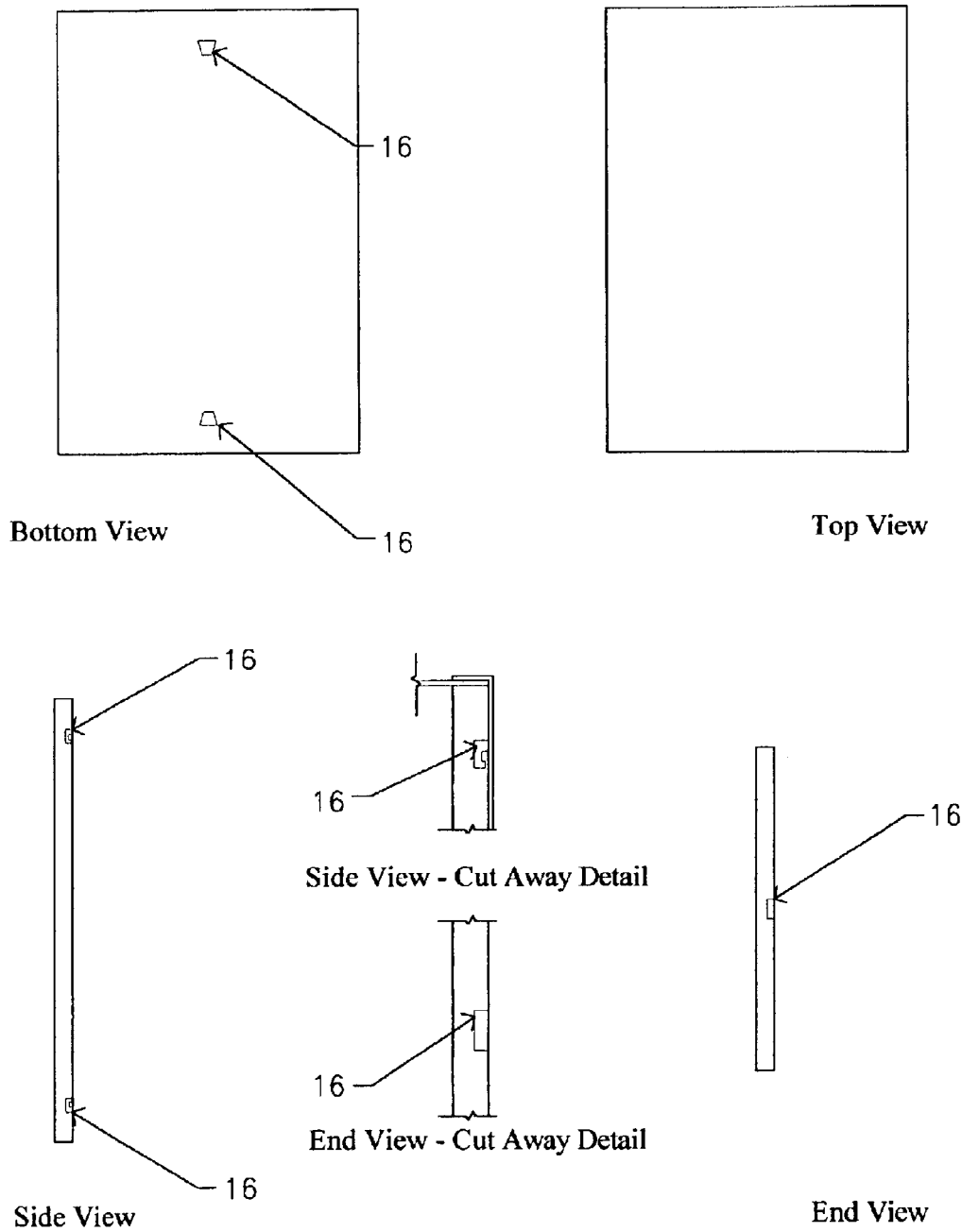
FIG. 13 shows surface type cover that fits over and around the box opening or throat.
Figure 14:
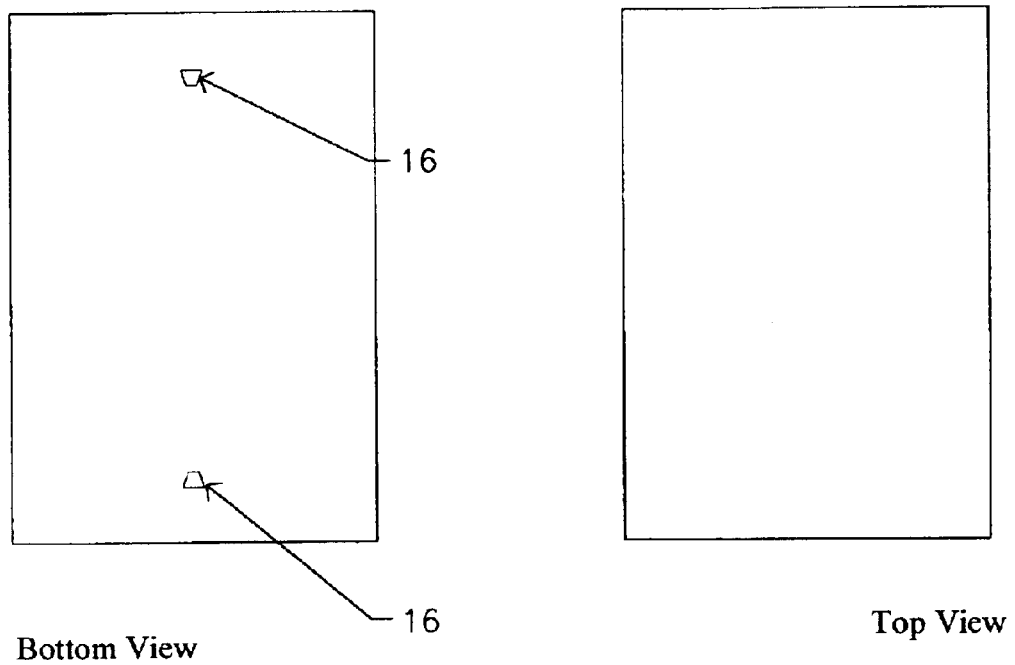
FIG. 14 shows flush type cover that fits over box opening and edge of wall that the box has been mounted in flush.
Figure 14:
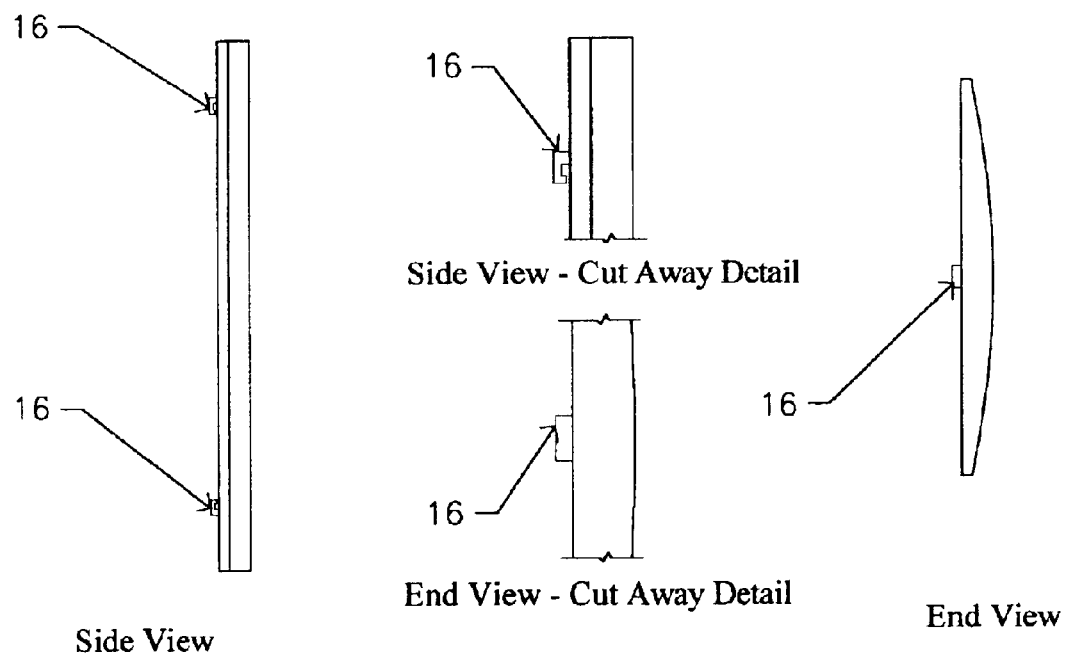

FIGS. 12–14 Additional Embodiments

Additional embodiments shown in FIGS. 12, 13, and 14 include the mounting wire spring FIG. 12, and blank covers, FIGS. 13 and 14. Wire springs, FIG. 12, will be used to adapt chimes, special equipment, or blank covers, FIGS. 13 and 14, to the box, FIG. 1, according to usage. Wire springs, FIG. 12, will vary in shape and in strength according to the type of equipment to be fastened to the box, FIG. 1. Heavy equipment will require a heavier gauge wire spring and possibly a different shape but the method of connection to the box, FIG. 1, and its wire spring retainer adapters 3 and 7 will remain the same. When attaching chime to box FIG, it will require (2) wire springs, FIG. 12, attached to the back of chime body. These springs will be attached to chime body by mounting hooks 16 cast into and made a part of chime back plate.

FIG. 29 shows these wire springs connected to the back of mockup chime. These fasteners are very small 2 hole straps and are screwed to the back of the mockup chime. Cast hooks 16, straps and other methods will be employed in fastening the wire springs, FIG. 12, to various types of equipment. The above description of wire springs and the means of fastening said springs to chimes, covers or other equipment should not be construed as limiting the scope of the invention but as merely providing illustrations of some of the presently preferred embodiments of this invention.

Alternative Embodiments

The transformer of the present embodiment and its screw type wire terminals. There are many methods of connecting the low voltage (24 v) wires to the transformer, chimes and various types of equipment. The use of quick type connects will be used when possible. These are not shown because there are so many different types. These alternatives are represented to illustrate that the specificities should not be construed as limiting this portion of the invention.

Advantages

From the description above a number of advantages become evident:

(a) Chime transformers will no longer be mounted in remote somewhat inaccessible locations.

(b) Both low voltage (24 v) and higher voltage (120 v) wiring can be installed in the same box. This satisfies Article 725–57 (a) of the NEC which says class 1 and class 2 & 3 wires cannot be installed in the same enclosure, box or raceway.

(c) This invention brings together all components of a door chime system, namely chime and transformer, into one very accessible location.

(d) The mounting of the chime will no longer be by screws inserted into sheetrock or the wallboard material. By wire springs the chime will be mounted to the new back box.

(e) Because of the convenient location of the backbox and the chime the labor required for the entire installation will be much less.

(f) Servicing the equipment used in this system will be much easier and quicker because the location of the assembly will be readily accessible.

(g) Although the preferred embodiment of this invention is a new chime and mounting system; it will be used for powering up and mounting of multiple types of equipment.

Operation-FIGS. 1–12

The manner of using the back box and its companion chime requires the following procedure. The first item to be installed is the backbox. This is done by mounting the box to a stud in a new wall by either using (4) screws or nails inserted thru holes in flange 4 and imbedding these fasteners all the way until the box is pulled up tight to the stud. If it is to be mounted in masonry units then the flanges will need to be broken off along score lines 5 and the masons will build it into the wall so that the top of the box will be facing out and will be flush with the surface of the wall. When the box is to be mounted on a surface, it will require using the flanges 4 or insert screws or nails through the bottom of the box and drive these fastening devices up tight until the box is pulled tight against the surface it is to be mounted against.

With the flush mounting of the box in masonry; the wiring will have to be done by a method of pre-wiring. This could be by conduit, metal jacketed cable, non-metalic sheathed cable or etc. Once these wires are inserted into the box thru knockouts 11 on the left or right side of the box, the box is ready to be bricked into the wall. If the box is mounted to a surface or flush in a stud wall, the wiring can be installed after the box is mounted. These wires will be extended through the same knockouts 11 on the left or right side. With cable, a connector would be required for each knockout used. When other methods are used to connect to these knockouts such as for conduit; the approved type of connector is to be used.

FIG. 27 shows these required cables entering the box at the top (left side) where the box is end mounted with the left side facing up. This mockup of the box and its interior barrier, demonstrate all operations that have been described to this point. In the same FIG. 27, you will see that the large wires (120 v) are entering in the transformer compartment while the small wires (24 v) are entering in the exposed area that makes up the low voltage compartment. This separation of the two voltages is one of the preferred embodiments of this invention.

FIG. 28 shows the backbox ready for the chime to be mounted. The wallboard has been installed and the neck of the box is shown as flush to that surface. That will be the results of properly spacing the box while mounting it as the first element of installation. The 24 v wires shown hanging out of the box are wires that are run to the front and back doors. One conductor of both of these (2 conductor) wires will be fastened to the transformer terminals. Of the two terminals on the transformer, one is phase power (24 v) and one is a neutral. It is preferred that the conductor used from each of these doorbell wires be twisted together and wrapped around one of the transformer screws, which is then tightened firmly on the wires. The chime will have (3) leads of the following colors: black for the front doorbell button wire, red for the rear doorbell button wire, and white for connection to the other terminal on the transformer which has not been used yet. The black wire must be connected to the remaining front doorbell button wire and the red wire must be connected to the remaining rear doorbell button wire.

The last phase of the operation is now possible. Grasping the door chime in both hands and looking on the back side you will see the mounting wire springs 12. Each spring must be grasped between your thumb and index fingers and squeezed together so that the tips of the springs touch. In this position the springs are ready to be inserted into the spring adapter slots 3 and 7. By pushing the chime towards the backbox, the wire springs will at first squeeze together even more, but when inserted far enough the springs start to spread out and with that spreading they begin to exert a pulling pressure on the chime. As the chime nears the opening of the box, a substantial pressure is exerted on the chime causing it to pull snug against the box and wail. As you can see in mockup FIG. 31, the backbox is obscured by the chime in its final position. The pulling pressure is sufficient to hold the chime in place and no one would know that the backbox with its transformer and its wiring are directly behind it.

All other types of equipment regardless of what they are like including the blank covers will be mounted to the backbox the same way.

Conclusion, Ramifications, and Scope

Accordingly the reader will see that the use of this backbox/chime assembly as a signal device in the building and housing industry will change the way electricians have been doing this part of a wiring job. No longer will they have to remotely install the transformer in a method that later causes problems of location and servicing. No answer for the difficulties brought about by the safety intent of the NEC and the inspectors that are appointed to enforce the same was developed until this invention. Electricians were able to install these required components in various locations and wire them together to make a working system. This multi-location type of installation has been used for most of a century. The use of a central location for the total chime system will become an industry standard. Additional advantages to this system are:

Wiring of this system will be easy and require much less labor to complete it.

No searches for the transformer location in a hot attic or in the damp underfloor area of a crawl space will ever be required for servicing or replacing this equipment.

The mounting of chimes will be a quick snap in method instead of a labor intense screw to the wall method.

Backboxes can be used in any type of installation surface or flush.

If other equipment is used with the transformer in the backbox as its source of power then that equipment can be mounted to the box or wiring can be extended from the box to the equipment and a blank cover can enclose the box and the wire connections.

The backboxes can be fitted with different sizes of transformers according to equipment needs, and where they are not big enough, the box can be sized larger while using the same format.

Specifications have been given of the above assembly, but these should not be construed as limiting the scope of the invention. These merely provide illustrations of some of the presently preferred embodiments of the invention. For example, the box materials can be of metal or plastic. Wire connections may not rely on terminal screws only. Shapes of devices shown may vary with additional uses, etc.

Thus the scope of the invention should be determined by the appended claims and their legal equivalents, rather than by the examples given.

What is claimed is:

1. An enclosure to house a transformer for a chime or other low voltage equipment comprising:

a metal or plastic box having a plurality of knock-outs for cables or conduits entrances, a support for various sized small low voltage transformers, a surface mounting cover or a flush mounting cover, a vertical mounting flange being mounted at each side of said box at one end, a plurality of wire spring retainer slots, one of said retainer slots either welded or punched at said mounting flange and other of said retainer slots at opposite ends of said box, a plurality of mounting slots through an upper edge of a back wall of said box, a barrier with a plurality of tabs to engage said slots in said back wall of said box to secure said barrier to said box, a plurality of wire spring retainer slots, said barrier divides said box into a separate high voltage compartment and a low voltage compartment, said flange having a plurality of grooves and can be easily broken off the box rendering the box square without said flange and can be mounted in stone or masonry walls, and a plurality of springs, each of said springs can be inserted into one of said slots to tighten to the face of said enclosure, or any equipment can be mounted to the enclosure with screw tabs at each end of said box.

* * * * *